US008224729B2

(12) United States Patent
Hansen

(10) Patent No.: US 8,224,729 B2
(45) Date of Patent: *Jul. 17, 2012

(54) SYSTEM AND METHOD FOR MANAGING AND EVALUATING NETWORK COMMODITIES PURCHASING

(75) Inventor: Valerie Hansen, Racine, WI (US)

(73) Assignee: BuyMetrics, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/118,351

(22) Filed: May 27, 2011

(65) Prior Publication Data

US 2011/0231339 A1    Sep. 22, 2011

Related U.S. Application Data

(63) Continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(51) Int. Cl.
*G06Q 40/00* (2006.01)

(52) U.S. Cl. ............... 705/35; 705/7; 705/7.34; 705/20; 705/26; 705/26.64; 705/30; 705/37; 705/313; 705/400

(58) Field of Classification Search ............... 705/35–45
See application file for complete search history.

(56) References Cited

U.S. PATENT DOCUMENTS

| 4,992,940 A | | 2/1991 | Dworkin | |
|---|---|---|---|---|
| 5,168,446 A | * | 12/1992 | Wiseman | 705/37 |
| 5,297,031 A | * | 3/1994 | Gutterman et al. | 705/37 |
| 5,414,621 A | * | 5/1995 | Hough | 705/7.34 |
| 5,715,402 A | * | 2/1998 | Popolo | 705/37 |
| 5,732,400 A | * | 3/1998 | Mandler et al. | 705/26.44 |

(Continued)

FOREIGN PATENT DOCUMENTS

JP     62-139088 A     6/1987

(Continued)

OTHER PUBLICATIONS

Boer, Germain et al. Target Costing Can Boost Your Bottom Line. Strategic Finance. © Jul. 1, 1999.*

(Continued)

*Primary Examiner* — Robert R Niquette

(74) *Attorney, Agent, or Firm* — Christensen O'Connor Johnson Kindness PLLC

(57) ABSTRACT

Comparison values are calculated for evaluating a commercial transaction. A request for quote received from a buyer agent includes a product specification data set that identifies items that differ in accordance with at least one parameter. Price data sets received from seller agents identify items and prices in response to the product specification data set. At least one of the price data sets identifies an item having a different parameter value as compared to the item in another price data set. A comparison value for each price data set is generated by determining a price total from the price data set and calculating a summed market price total by summing market price totals for each of the items. Calculating market price totals includes obtaining metric data indicative of market prices. The summed market price total is compared to the price total for the price data set to generate the comparison value.

29 Claims, 13 Drawing Sheets

U.S. PATENT DOCUMENTS

| | | | |
|---|---|---|---|
| 5,761,389 A | 6/1998 | Maeda | |
| 5,842,178 A * | 11/1998 | Giovannoli | 705/26.4 |
| 5,857,174 A * | 1/1999 | Dugan | 705/313 |
| 5,991,696 A | 11/1999 | McAndrew | |
| 6,023,683 A | 2/2000 | Johnson | |
| 6,038,537 A * | 3/2000 | Matsuoka | 705/7.12 |
| 6,055,516 A | 4/2000 | Johnson | |
| 6,055,518 A | 4/2000 | Franklin | |
| 6,058,379 A * | 5/2000 | Odom et al. | 705/37 |
| 6,076,070 A * | 6/2000 | Stack | 705/20 |
| 6,311,144 B1 | 10/2001 | Abu El Ata | |
| 6,460,020 B1 * | 10/2002 | Pool et al. | 705/7.29 |
| 6,505,172 B1 | 1/2003 | Johnson | |
| 6,510,434 B1 | 1/2003 | Anderson | |
| 6,564,192 B1 | 5/2003 | Kinney, Jr. | |
| 6,850,900 B1 | 2/2005 | Hare | |
| 6,976,006 B1 * | 12/2005 | Verma et al. | 705/26.64 |
| 7,010,494 B2 | 3/2006 | Etzioni | |
| 7,031,901 B2 | 4/2006 | Abu El Ata | |
| 7,043,457 B1 | 5/2006 | Hansen | |
| 7,058,598 B1 | 6/2006 | Chen | |
| 7,124,106 B1 | 10/2006 | Stallaert | |
| 7,149,717 B1 * | 12/2006 | Kan | 705/37 |
| 7,379,898 B2 | 5/2008 | Tenorio | |
| 7,430,531 B1 * | 9/2008 | Snyder | 705/35 |
| 7,447,653 B1 * | 11/2008 | Watanabe et al. | 705/37 |
| 7,577,582 B1 | 8/2009 | Ojha | |
| 7,653,583 B1 | 1/2010 | Leeb | |
| 7,660,738 B1 | 2/2010 | Siegel | |
| 7,685,048 B1 | 3/2010 | Hausman | |
| 7,702,615 B1 | 4/2010 | Delurgio | |
| 7,725,358 B1 | 5/2010 | Brown | |
| 7,765,140 B1 | 7/2010 | Megiddo | |
| 7,835,970 B1 | 11/2010 | Marchegiani | |
| 7,840,476 B1 | 11/2010 | Zack | |
| 7,970,713 B1 * | 6/2011 | Gorelik et al. | 705/400 |
| 8,150,735 B2 | 4/2012 | Walker | |
| 2001/0032116 A1 | 10/2001 | Hyatt | |
| 2001/0032163 A1 * | 10/2001 | Fertik et al. | 705/37 |
| 2001/0032171 A1 * | 10/2001 | Brink et al. | 705/37 |
| 2002/0007324 A1 | 1/2002 | Centner | |
| 2002/0010663 A1 * | 1/2002 | Muller | 705/30 |
| 2002/0019794 A1 * | 2/2002 | Katz et al. | 705/37 |
| 2002/0026403 A1 | 2/2002 | Tambay | |
| 2002/0026630 A1 | 2/2002 | Schmidt | |
| 2002/0069134 A1 | 6/2002 | Solomon | |
| 2002/0111873 A1 | 8/2002 | Ehrlich | |
| 2002/0152135 A1 | 10/2002 | Beeri | |
| 2002/0156685 A1 | 10/2002 | Ehrlich | |
| 2003/0065586 A1 | 4/2003 | Shaftel | |
| 2003/0093343 A1 * | 5/2003 | Huttenlocher et al. | 705/35 |
| 2003/0097328 A1 | 5/2003 | Lundberg | |
| 2003/0233305 A1 | 12/2003 | Solomon | |
| 2004/0015415 A1 | 1/2004 | Cofino | |
| 2005/0010494 A1 | 1/2005 | Mourad | |
| 2006/0253334 A1 | 11/2006 | Fukasawa | |
| 2007/0250431 A1 | 10/2007 | Olof-Ors | |
| 2008/0071638 A1 | 3/2008 | Wanker | |
| 2008/0077542 A1 | 3/2008 | McElhiney | |
| 2008/0270221 A1 | 10/2008 | Clemens | |
| 2009/0083120 A1 | 3/2009 | Strichman | |
| 2009/0138411 A1 | 5/2009 | O'Callahan | |
| 2010/0023379 A1 | 1/2010 | Rappaport | |
| 2010/0082419 A1 | 4/2010 | Au-Yeung | |
| 2010/0185554 A1 | 7/2010 | Sivasundaram | |

FOREIGN PATENT DOCUMENTS

| | | | |
|---|---|---|---|
| WO | 00/16232 A1 | | 3/2000 |
| WO | WO 00/16232 | * | 3/2000 |
| WO | WO00/16232 | * | 3/2000 |

OTHER PUBLICATIONS

Boer, Germain; Ettlie, John. Target costing can boost your bottom line. Strategic Finance. Jul. 1, 1999.*

Boer, G., et al., "Target Costing Can Boost Your Bottom Line," Strategic Finance, pp. 49-52, Jul. 1999.

O'Brien, T., "A Day at the Park Costs More Than Ever," Amusement Business 108(25):Jun. 3, 1996.

Plotkin, D., "Business Rules Everywhere, Part 2," Intelligent Enterprise 2(10):42-48, Jul. 1999.

* cited by examiner

| http://www.probuild.com/buymetrics/RFQSoftwood/Compare.asp?Order=T&RFQID=82 | | | | | | | | | | | |
|---|---|---|---|---|---|---|---|---|---|---|---|
| FILE EDIT VIEW FAVORITES TOOLS HELP | | | | | | | | | | | |

BACK  FORWARD  STOP  REFRESH  HOME  SEARCH  FAVORITES  HISTORY  MAIL  SIZE  PRINT

LINKS » | ADDRESS http://www.probuild.com/buymetrics/RFQSoftwood/Compare.asp?Order=T&RFQID=82 | GO

Softwoods RFQ Summary

[Unsubmit] [Close/Archive] [Resend] [Add Response] [Display Notes]

Requested Tally(s):

| Delivered on or Before: 8/01/00 | | | For Delivery week of (FORWARDED PRICE): | | | | | | | |
|---|---|---|---|---|---|---|---|---|---|---|
| Qty | Delivery | Lumber Type | 8 | 10 | 12 | 14 | 16 | 18 | 20 | Delivery Location | Price | Price Units |
| 1 | Car50 | 2 x 4 ESPF 2&B | 4 | 4 | 6 | 2 | 6 | | | Chicago, Illinois | | |
| or | | | | | | | | | | | |

Tally Response Information:

Lumber Supplier
Comparison: PCS/Unit:294 | Price/M:320 | Freight: | Quote $ / Metric $:0.9708028 | Metric $ / M:333.2790 | View Calculation Detail | Buy!

| Delivered on or Before: 8/1/00 | | | For Delivery week of (FORWARD PRICE): | | | | | | | |
|---|---|---|---|---|---|---|---|---|---|---|
| Qty | Delivery | Lumber Type | 8 | 10 | 12 | 14 | 16 | 18 | 20 | Delivery Location | Price | Price Units |
| 1 | Car50 | 2 x 4 ESPF 2&B | 4 | 4 | 6 | 3 | 5 | | | Chicago, Illinois | 320 | m |
| or | | | | | | | | | | net 10 | | |

Lumber Supplier
Comparison: PCS/Unit:294 | Price/M:322 | Freight: | Quote $ / Metric $:0.9704903 | Metric $ / M:331.791 | View Calculation Detail | Buy!

| Delivered on or Before: 8/1/00 | | | For Delivery week of (FORWARD PRICE): | | | | | | | |
|---|---|---|---|---|---|---|---|---|---|---|
| Qty | Delivery | Lumber Type | 8 | 10 | 12 | 14 | 16 | 18 | 20 | Delivery Location | Price | Price Units |
| 1 | Car50 | 2 x 4 ESPF 2&B | 4 | 4 | 6 | 2 | 6 | | | Chicago, Illinois | 322 | m |
| or | | | | | | | | | | net 10 | | |

| http://www.probuild.com/buymetrics/SoftwoodTally.asp?MetricID=194$Action=FromSummary | | | | | | | | | | |
|---|---|---|---|---|---|---|---|---|---|---|
| FILE EDIT VIEW FAVORITES TOOLS HELP | | | | | | | | | | |
| BACK | FORWARD | STOP | REFRESH | HOME | SEARCH | FAVORITES | HISTORY | MAIL | SIZE | PRINT |
| LINKS | ADDRESS http://www.probuild.com/buymetrics/SoftwoodTally.asp?MetricID=194$Action=FromSummary | | | | | | | | | GO |

New Softwood RFQ | List Open Softwoods RFQs | List Submitted Softwoods RFQs | List Closed Softwoods RFQs | Tally Calculator | Manager
New Panel RFQ | List Open Panels RFQs | List Submitted Panels RFQs | List Closed Panels RFQs
New Program and Buy RFQ | List Unsolicited Offers Lumber Type:
- 2 x 4 WSPF 2&B
- 2 x 6 WSPF 2&B
- 2 x 4 ESPF 2&B Boston
- 2 x 8 WSPF 2&B
- 2 x 10 WSPF 2&B Calculate

| PCS Per Unit: | Price/M | Lumber Dimension: | Freight: | Metric $/M: | Quote $/Metric $ |
|---|---|---|---|---|---|
| 294 | 322 | 2 x 4 | | 331.791 | 0.970490 |

| Length | Qty | PCS | Piece | BF Total | Invoice Cost | Price | Spec Cost | Adj Cost | Metric $/M | Adj Piece Cost | Total: |
|---|---|---|---|---|---|---|---|---|---|---|---|
| 8 | 4 | 1176 | 5.3333 | 6272 | 2019.584 | 220 | 1881.6 | 1826.075 | 291.147 | 1.553 | 1826.328 |
| 10 | 4 | 1176 | 6.6667 | 7840 | 2524.48 | 225 | 2391.2 | 2320.636 | 295.999 | 1.973 | 2320.248 |
| 12 | 6 | 1764 | 8 | 14112 | 4544.064 | 220 | 4233.6 | 4108.668 | 291.147 | 2.329 | 4108.356 |
| 14 | 2 | 588 | 9.3333 | 5488 | 1767.136 | 260 | 1865.92 | 1810.857 | 329.967 | 3.08 | 1811.04 |
| 16 | 6 | 1764 | 10.6667 | 18816 | 6058.752 | 295 | 7056 | 6847.78 | 363.934 | 3.882 | 6847.848 |
| 18 | | 0 | 12 | | | 285 | | | | | |
| 20 | | 0 | 13.3333 | | | 285 | | | | | |
| TOTALS | 22 | 6468 | | 52528 | 16914.016 | | 17428.32 | 16914.016 | | | 16913.82 |

*Fig.8D.*

SYSTEM AND METHOD FOR MANAGING AND EVALUATING NETWORK COMMODITIES PURCHASING

FIELD OF THE INVENTION

This invention generally relates to electronic commerce software applications and, more particularly, to a method and system relating to commodities purchasing over a network of distributed computing devices.

BACKGROUND OF THE INVENTION

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and length, as well as the "tally" or mix of units of various lengths within shipment, method of transportation (i.e., rail or truck), shipping terms (i.e., FOB or delivered), and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. In a market where the shipping parameters are not identical, it is very difficult for buyers to determine the comparative value of unequal offerings.

Typically a lumber buyer will find multiple vendors each having different offerings available. For example, a railcar of SPF 2×4's may be quoted at a rate of $300/MBF (thousand board feet) by multiple vendors. Even though MBF price is equal, one vendor's carload may represent significantly greater marketplace value because it contains the more desirable lengths of 2×4's, such as builder preferred sixteen foot 2×4's. When the offering price varies in addition to the mix of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute.

Therefore, from the foregoing, there is a need for a method and system that allows buyers to evaluate the price of commodity offerings possessing varying shipping parameters.

SUMMARY OF THE INVENTION

The present invention provides a system and method for managing and evaluating commodities purchasing over a network of distributed computing devices. In one embodiment, buyers generate a request for quote and, in response to the request for quote, receive a quote from a plurality of sellers. A price normalization routine allows buyers to evaluate and compare a normalized price for commodity products having different evaluation parameters. In one example, a plurality of computers are connected to a network, including at least one server, at least one buyer client computer, and a plurality of seller client computers. A method for evaluating commodities pricing first provides a browsable display describing at least one commodities exchange service. At least one request for quote (RFQ) is received from a buyer. Responsive to the RFQ, the system then receives at least one quote from different sellers, where each quote may have a different price and quantity listed. The system normalizes the prices received from the different quotes by applying a metric factor to the quote and at least one comparison value is generated. A comparison value allows the buyer to readily compare the prices of a number of commodities having inherently different values to an objective measure. In addition, the system tracks all transactional activity and provides a cross compilation tool for evaluation and analysis.

In regard to the latter, a method for evaluating commodities pricing comprises maintaining a database of commodities transactions. The database includes price data sets exchanged between buyer and seller agents. One or more price data sets exchanged between a particular buyer agent and a particular seller agent in a specified time period are retrieved from the database. In one embodiment, the specified time period may be a day, for example. The retrieved price data sets are summed to determine a summed price total. Additionally, metric data indicative of market prices for commodities indicated by the retrieved price data sets are received. The market prices for the commodities in the price data sets are summed to determine a summed market price total. The summed price total is then compared to the summed market price total to generate a comparison value.

The method may further comprise generating the comparison value by calculating a ratio of the summed price total and the summed market price total. In that regard, the ratio may be calculated by dividing the summed price total by the summed market price total.

If desired, the price data sets that are retrieved may be limited to price data sets exchanged in response to pricing inquiries that are sent at the same time. Moreover, multiple buyer agents and/or seller agents may be grouped such that the retrieved price data sets include price data sets of the group, which price data sets are summed to determine the summed price total. An output may be generated which reports the comparison value.

In yet another embodiment, a database of commodities transactions includes price data sets exchanged between a plurality of buyer and seller agents for pricing commodities. A method for evaluating commodities pricing comprises retrieving from the database one or more price data sets in a specified time period. Commodities indicated by the retrieved price data sets meet a specified criterion. The retrieved price data sets are summed to determine a summed price total. Additionally, metric data indicative of market prices for the commodities indicated in the retrieved price data sets are received. The market prices for the commodities are summed to determine a summed market price total. The summed price total is then compared to the summed market price total to generate at least one comparison value.

Again, the specified time period may be a day, for example. The comparison value may be generated by calculating a ratio of the summed price total and the summed market price total. In that regard, the ratio may be calculated by dividing the summed price total by the summed market price total. If desired, the retrieved price data sets may be limited to price data sets that resulted in a purchase of the commodities indicated by the price data sets.

As noted above, price data sets are retrieved such that commodities indicated by the price data sets meet a specified criterion. For example, without limitation, the specified criterion may be a size of commodity in the price data sets, a species of commodity in the price data sets, and/or a grade of commodity in the price data sets. In some embodiments, commodities indicated by the retrieved price data sets meet two or more specified criteria. Again, the method may further comprise generating an output that reports the comparison value.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present invention.

DETAILED DESCRIPTION OF THE PREFERRED EMBODIMENT

Figure 1:
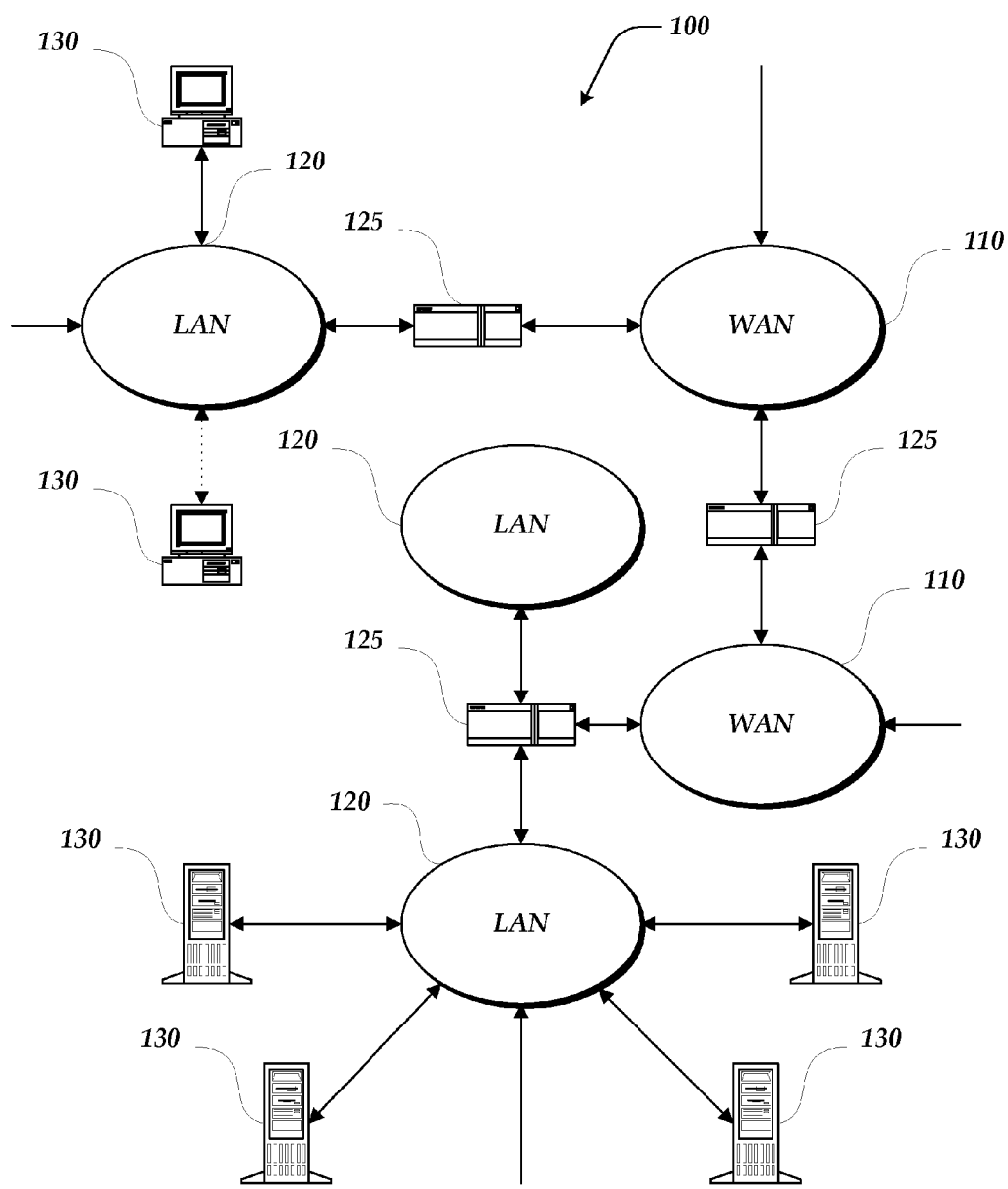
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small, representative section of the Internet 100 is shown in FIG. 1.

Figure 2:
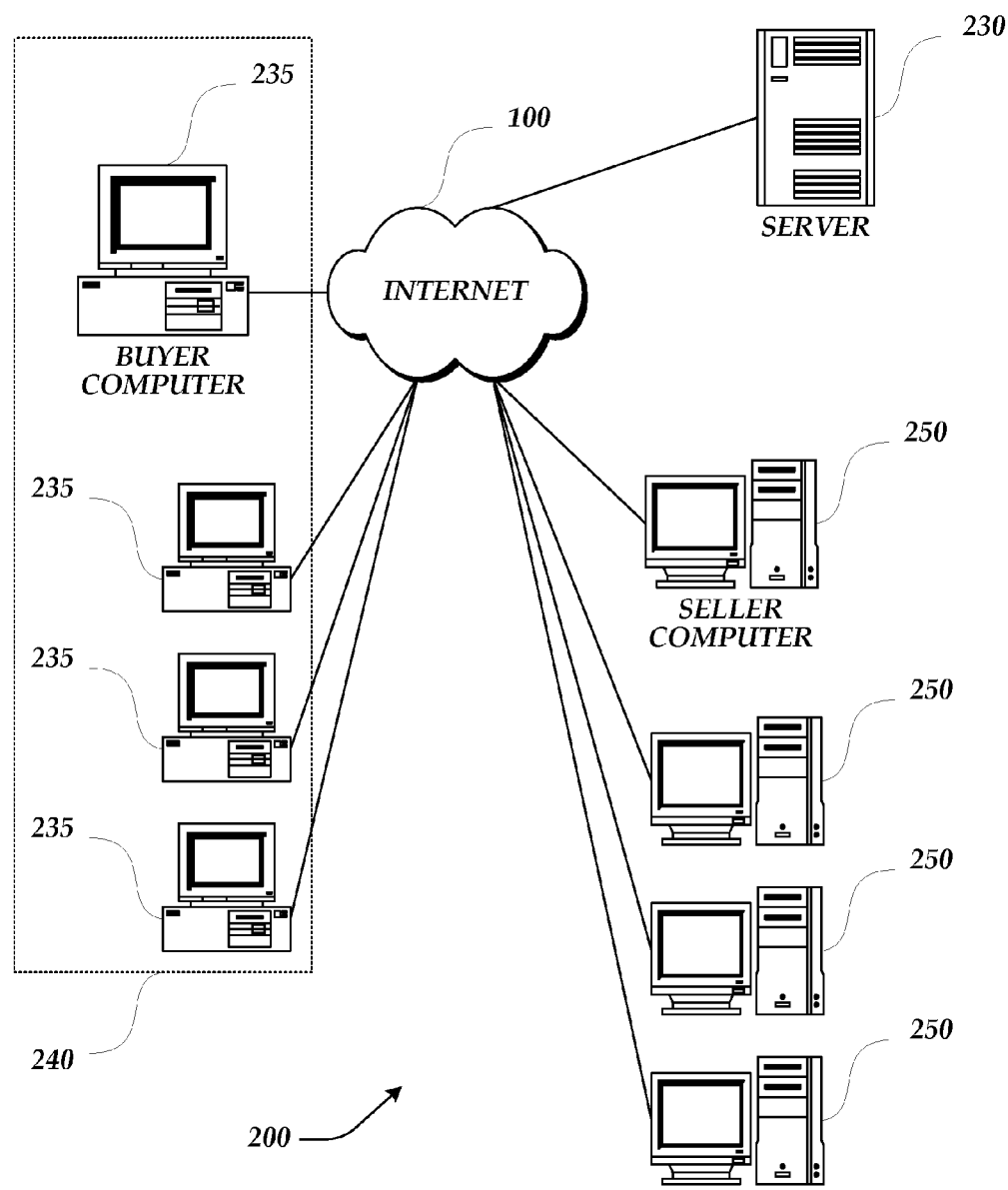
FIG. 2 is a pictorial diagram of a system of devices connected to the Internet, which depict the travel route of data in accordance with the present invention.

The World Wide Web (WWW), on the other hand, is a vast collection of interconnected, electronically stored information located on servers connected throughout the Internet 100. Many companies are now providing services and access to their content over the Internet 100 using the WWW. In accordance with the present invention and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100, is a plurality of computing devices 250 associated with a plurality of sellers. The system 200 also includes a communications program, referred to as CEA, which is used on seller's computing devices 250 to create a communication means between the seller's backend office software and the server application.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of buyers. Details of this process are described in more detail below in association with FIGS. 5-7.

Those of ordinary skill in the art will appreciate that in other embodiments of the present invention, the capabilities of the server 230 and/or the client computing devices 235 and 250 may all be embodied in the other configurations. Consequently, it would be appreciated that in these embodiments, the server 230 could be located on any computing device associated with the buyer or seller's computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
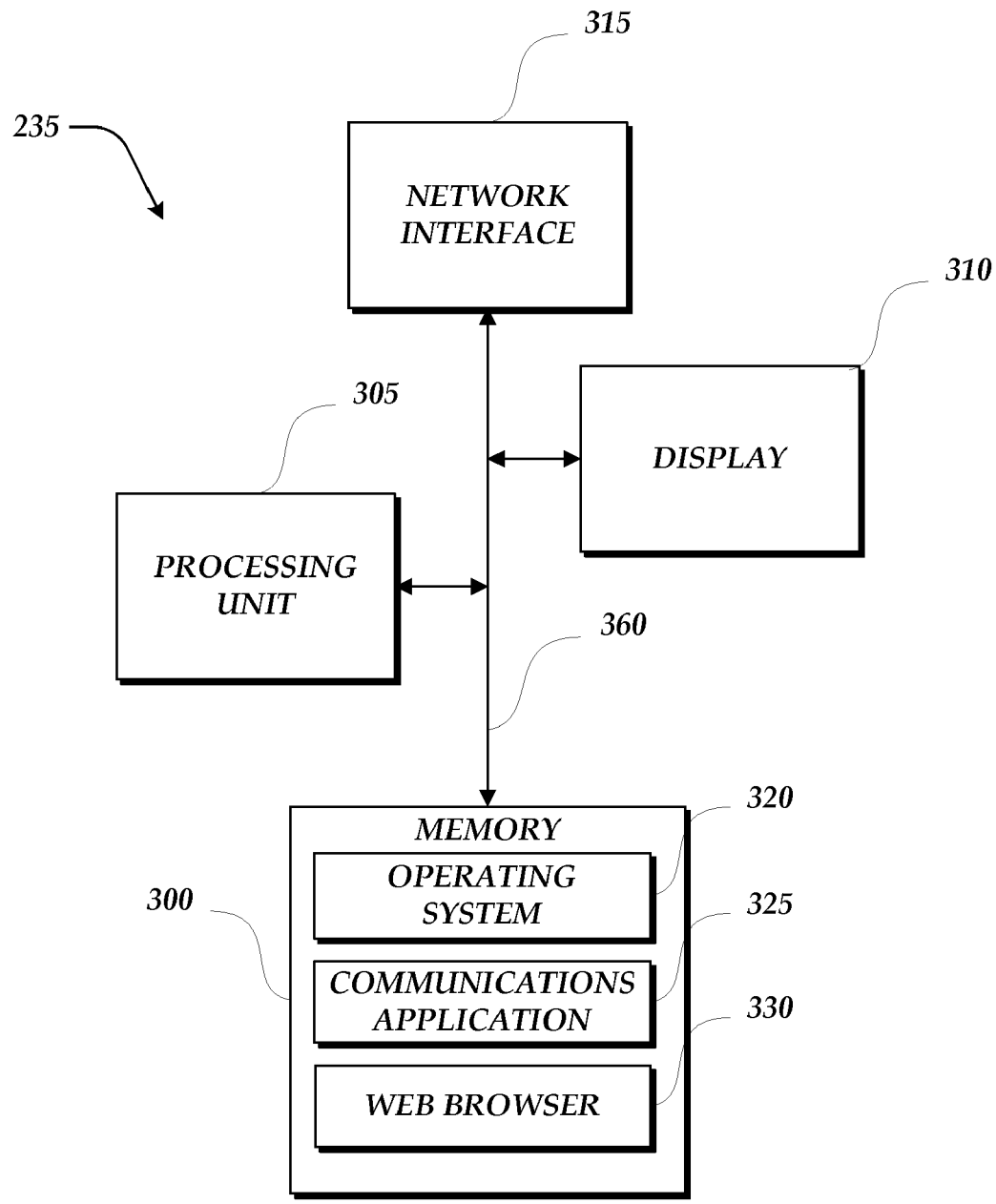
FIG. 3 is a block diagram of the several components of the buyer's computer shown in FIG. 2 that is used to request information on a particular route in accordance with the present invention.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer determined parameters. Those of ordinary skill in the art will appreciate that the buyer's computer 235 in actual practice will include many more components than those shown in FIG. 3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection, and is also constructed for use with the TCP/IP protocol.

The buyer's computer 235 also includes a processing unit 305, a display 310, and a memory 300 all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present invention. More specifically, the memory 300 stores a Web browser 330, such as Netscape's NAVIGATOR or Microsoft's INTERNET EXPLORER browsers, used in accordance with the present invention for depicting a desired route over the Internet 100. In addition, memory 300 also stores an operating system 320 and a communications application 325. It will be appreciated that these software components may be stored on a computer-readable medium and loaded into memory 300 of the buyers' computer 235 using a drive mechanism associated with the computer-readable medium, such as a floppy, tape, or CD-ROM drive.

Figure 4:
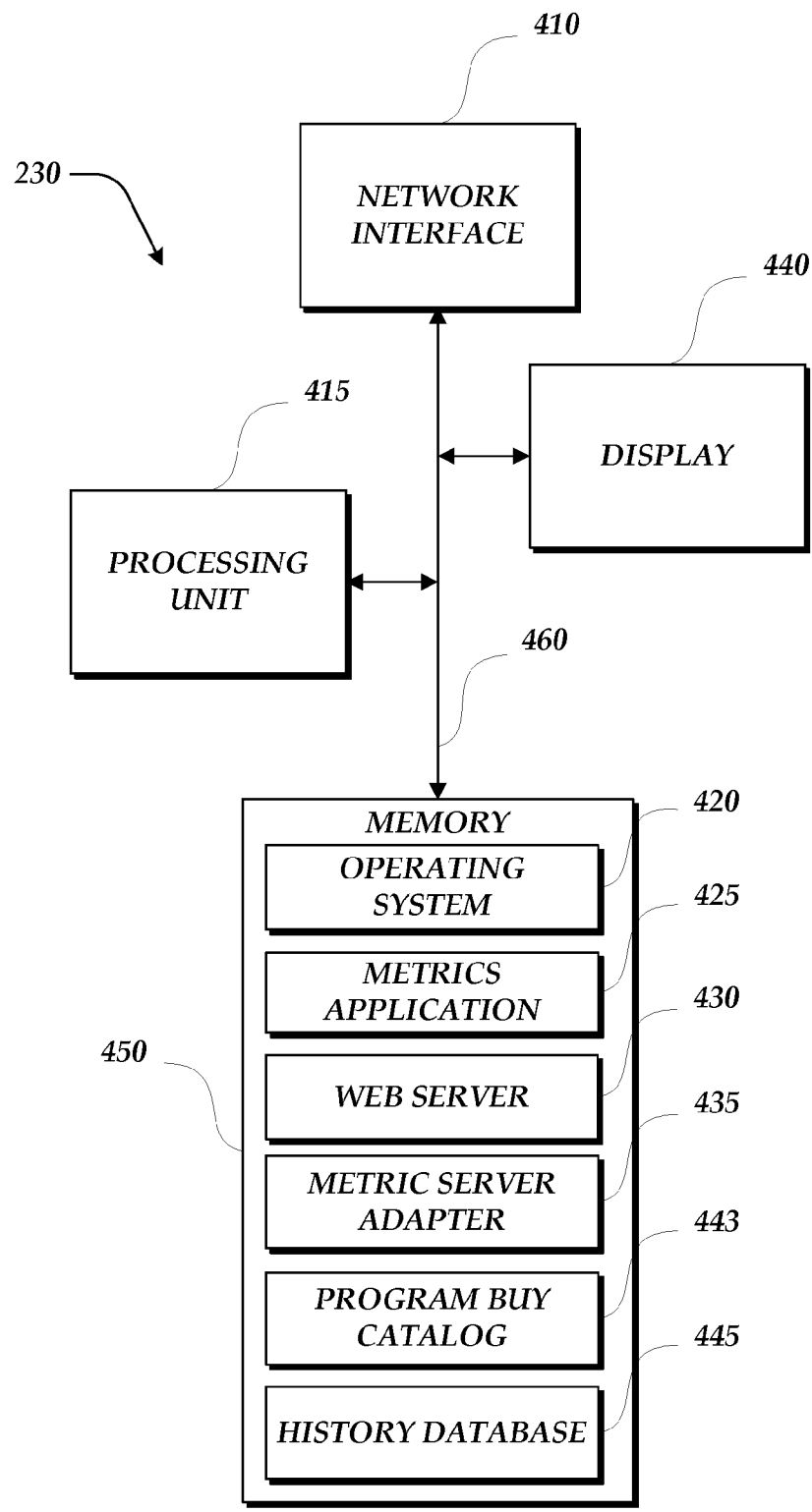
FIG. 4 is a block diagram of the several components of an information server shown in FIG. 2 that is used to supply information on a particular route in accordance with the present invention.

As will be described in more detail below, the user interface which allows products to be ordered by the buyers are supplied by a remote server, i.e., the information server 230 located elsewhere on the Internet as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with the TCP/IP protocol.

The information server 230 also includes a processing unit 415, a display 440, and a mass memory 450 all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present invention. More specifically, the mass memory 450 stores a metrics application 425 formed in accordance with the present invention for managing the purchase forums of commodities products. In addition, mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, mass memory 450 stores Web server software 430 for handling requests for stored information received via the Internet 100 and the WWW, and an operating system 420. It will be appreciated that the aforementioned software components may be stored on a computer-readable medium and loaded into mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
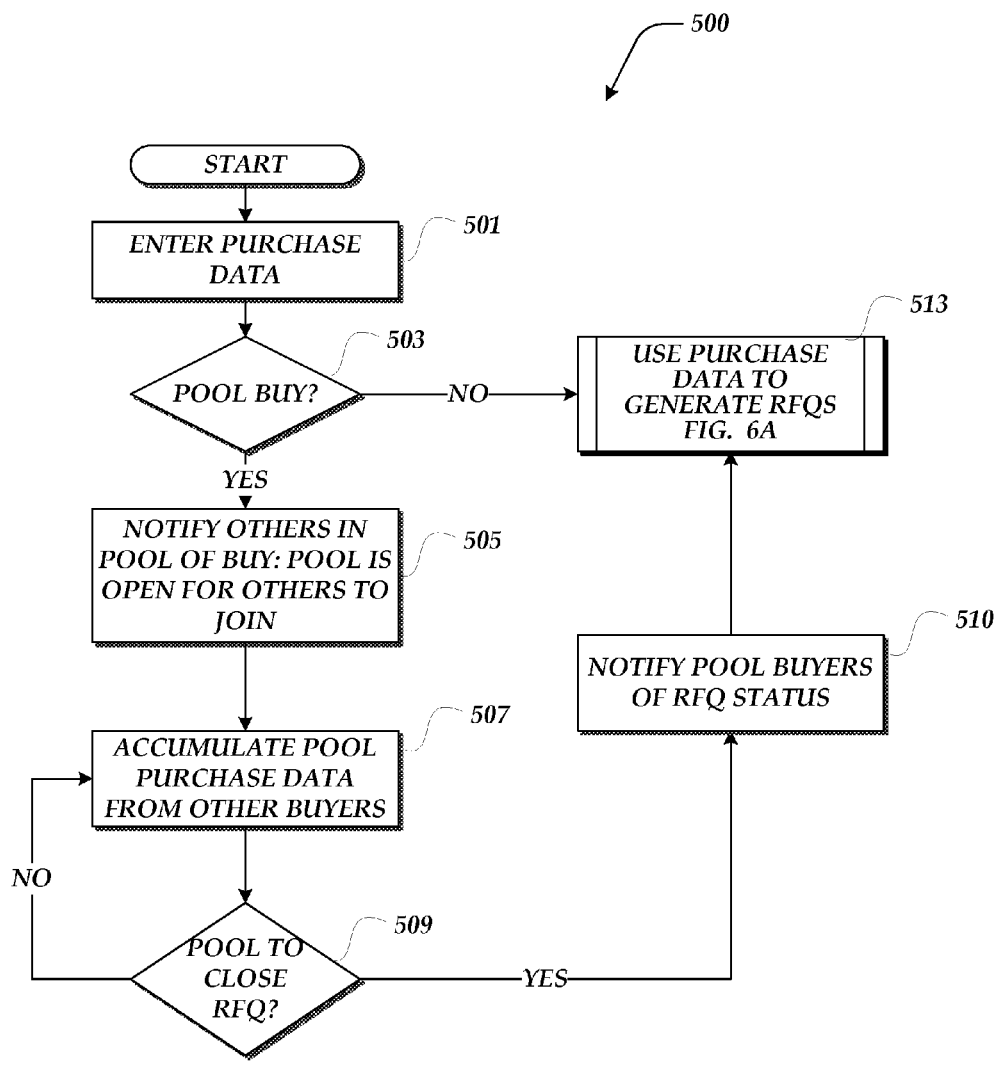
FIG. 5 is a flow diagram illustrating the logic of a routine used by the information server to receive and process the buyer's actions.

In accordance with one embodiment of the present invention, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers is displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
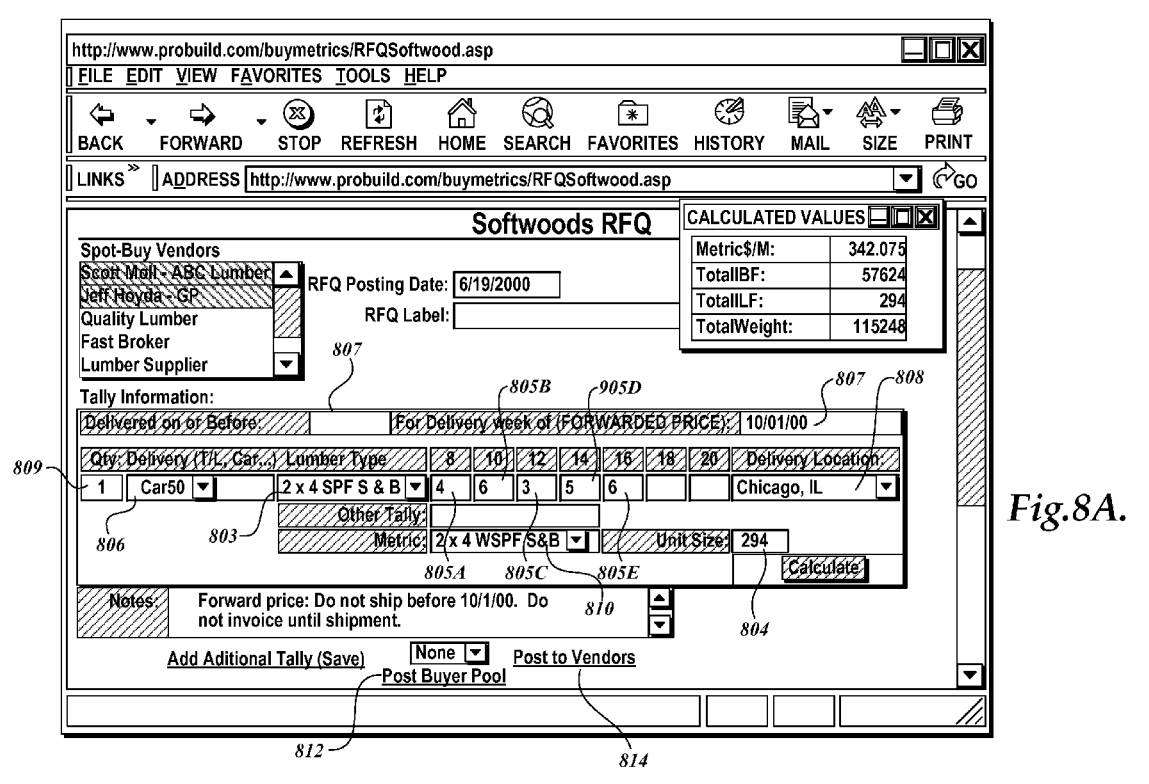

The pooling process 500 begins in a step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date, or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At a step 503, if the buyer does not elect to participate in a pool buy, the process continues to a step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively at the decision block 503, if the buyer elects to participate in a pool buy, the process continues to a step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an email message. In one embodiment, the pool administrator is one of the buyers in a pool, where the pool administrator has the capability to select all of the Line Item data to generate a combined RFQ. The server 230 provides the pool administrator with this capability by the use of any Web-based communicative device, such as email or HTML forms. As part of the process, as shown in steps 507 and 509, the pool may be left open for a predetermined period of time to allow additional buyers to add purchase data to the current RFQ.

At a decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as email or URL strings. Once the server 230 has determined that the pool is closed, the process continues to block 510 where the Line Items from each buyer (the combined RFQ) is sent to all of the buyers in the pool. The process then continues to the step 513 where the server 230 sends the combined RFQ to the vendors or sellers.

Figure 6A:
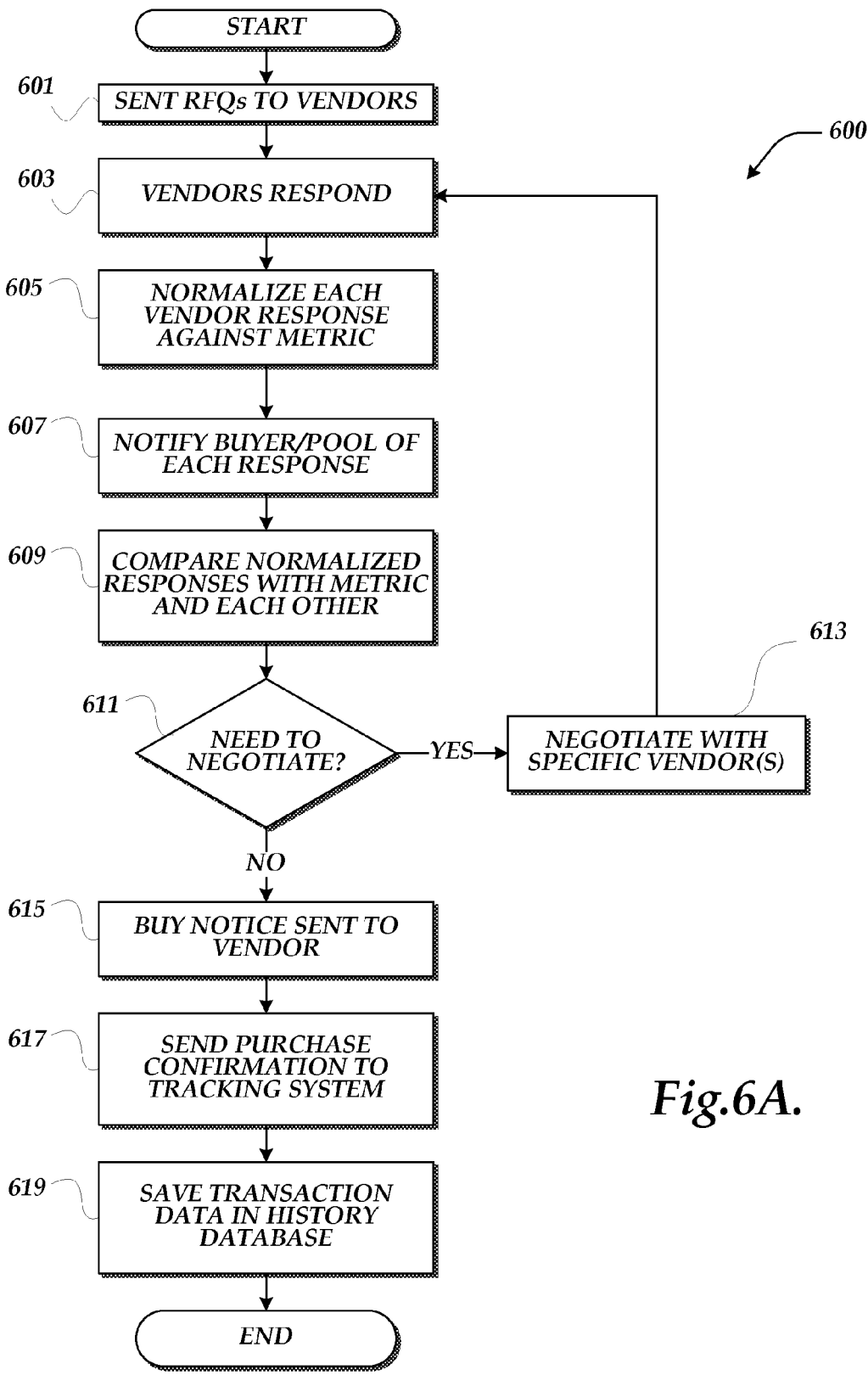
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a pre-defined metric(s). The calculation of the normalized price data set in combination with the format of the Web pages described herein create an integrated forum where quotes for a plurality of inherently dissimilar products can be easily obtained and compared.

The purchase-negotiation process 600 begins at a step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an email message having a hypertext link to the RFQ Web page to provide notice to the vendor. Responsive to the information in the buyers' RFQ, the process then continues to a step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an email message with a price and description of the order. The description of the order in the quote message contains the same order information as the RFQ.

Figure 8B:
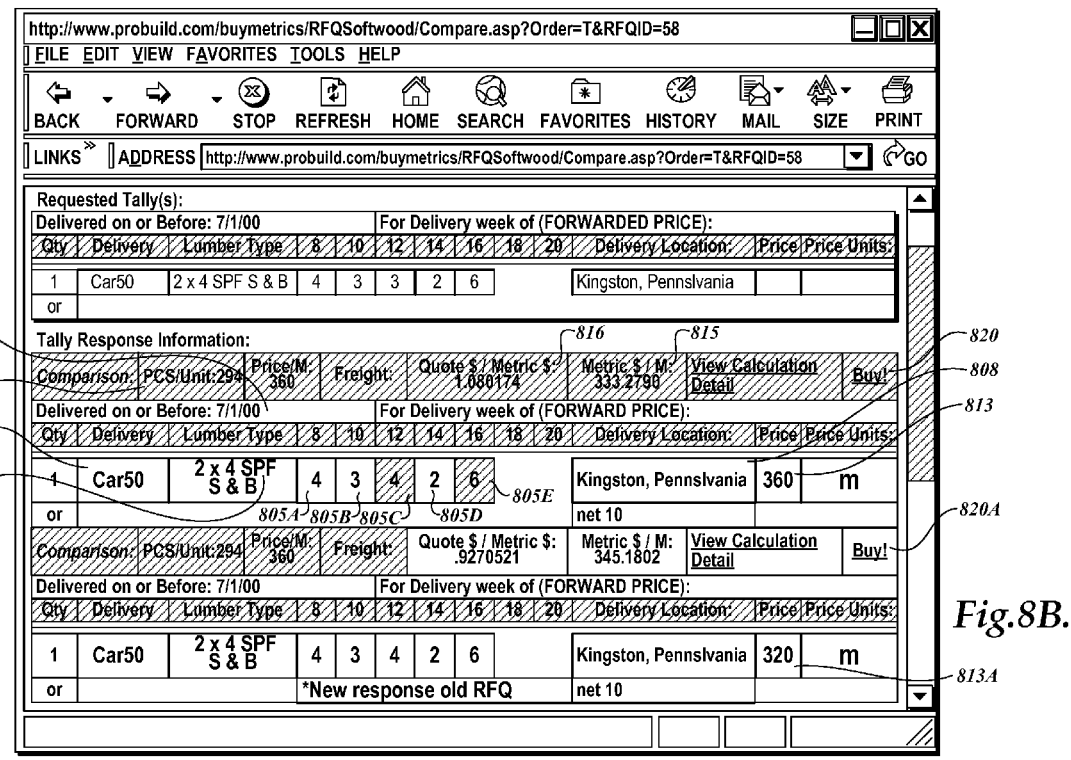

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to a step 605, where the server 230 normalizes the price of each RFQ Line Item (tally) quote from each vendor. The normalization of the vendor's price is a computation that adjusts the vendor's price utilizing data from a metric. The normalization process is carried out because each vendor may respond to the Line Items of an RFQ by quoting products that are different from buyer's RFQ and/or have a different tally configuration. The normalization of the pricing allows the buyers to objectively compare the relative value of the different products offered by the plurality of vendors. For example, one vendor may produce a quote for an RFQ of: one unit of 2×4×12, two units of 2×4×12, and three units of 2×4×16. At the same time, another vendor may submit a quote for three units of 2×4×12, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at a step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price vs. metric price ratio 816. The metric price 815 and the quote price vs. metric price ratio 816 are also referred to as a normalized price data value.

Next, at a step 609, the buyer or the administrator of the buyer pool, compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, email, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to a step 613 where they negotiate with the vendor to obtain another quote or present a counter offer. Here, the server 230 provides a graphical user interface configured to allow the buyer and one vendor to electronically communicate, such as a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to a step 615 where the buyer sends a notification message to the vendor indicating they have accepted a quote. As described above with reference to steps 603-613, the buyer notification message of step 615 may be in the form of a message on a chat window, email, by an HTML form, or the like. However, the buyer notification must be transmitted in a format that allows the system to record the transaction. The buyer notification may include all of the information regarding the specifications by RFQ Line Item, such as, but not limited to, the buy price, date and method of shipment, and payment terms.

The purchase-negotiation process 600 is then finalized when the system, as shown in a step 617, sends a confirmation message to a tracking system. The confirmation message includes all of the information related to the agreed sales transaction.

Optionally, the process includes a step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
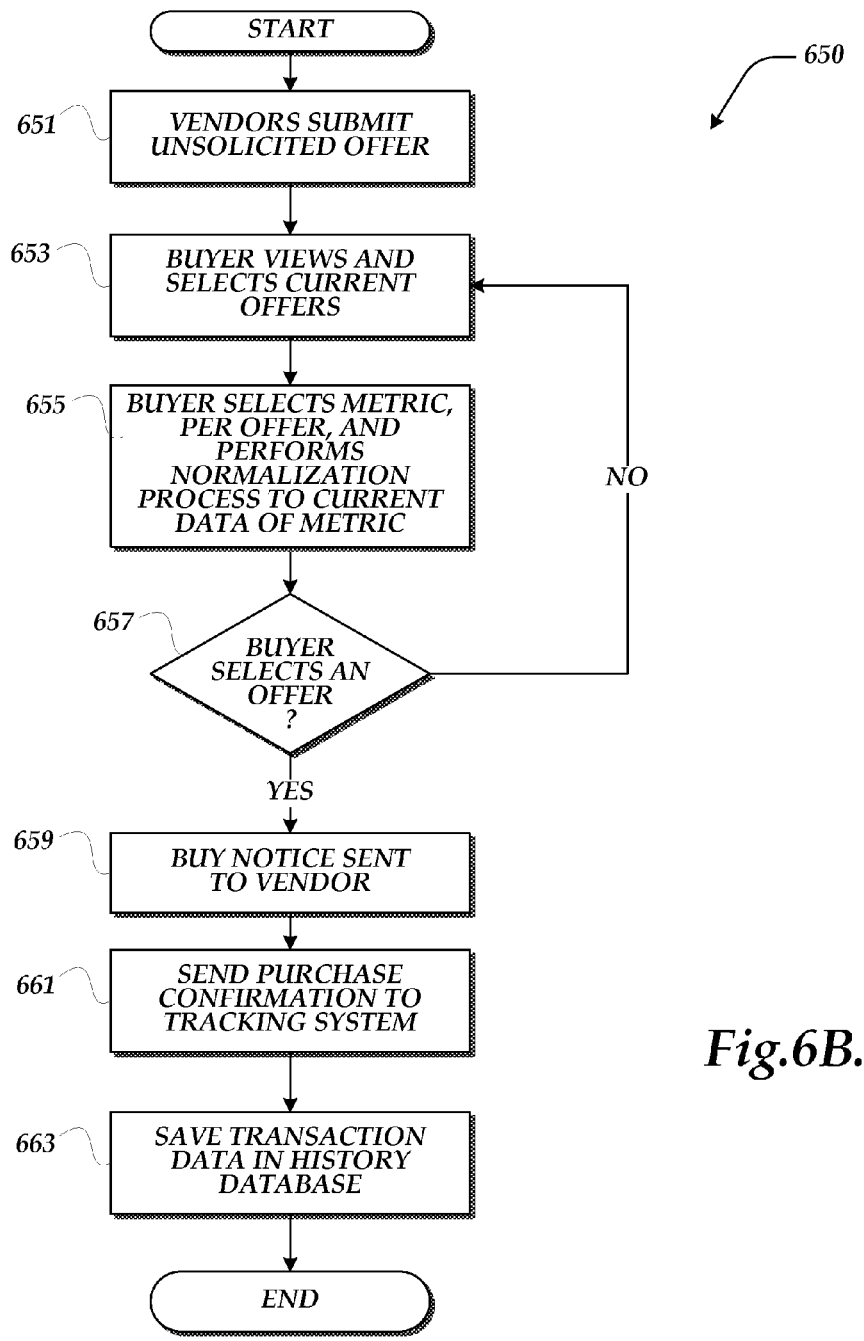

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers from a plurality of inherently dissimilar products can be obtained and normalized for determination of purchase.

The unsolicited offer process 650 begins at a step 651 where the plurality of vendors are able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at a step 653, a buyer views the offers stored on the server 230. This part of the process is carried out in a manner similar to the process of step 603 or 607 where the server 230 displays a plurality of offers similar to the tallies depicted in FIG. 8A.

Next, at a step 655, the buyer selects a metric for the calculation of the normalized price associated with the selected offer. As described in more detail below, metrics may come from publicly available information, i.e., price of futures contracts traded on the Chicago Mercantile Exchange, subscription services such as Crowes™ or Random Lengths™ accessed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors, and have a different tally configuration from those supplied by other vendors. The normalization of the pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where at step 659 the process transmits a buy notice to the vendor, then at step 661 sends a purchase confirmation to the tracking system, and then at step 663 saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
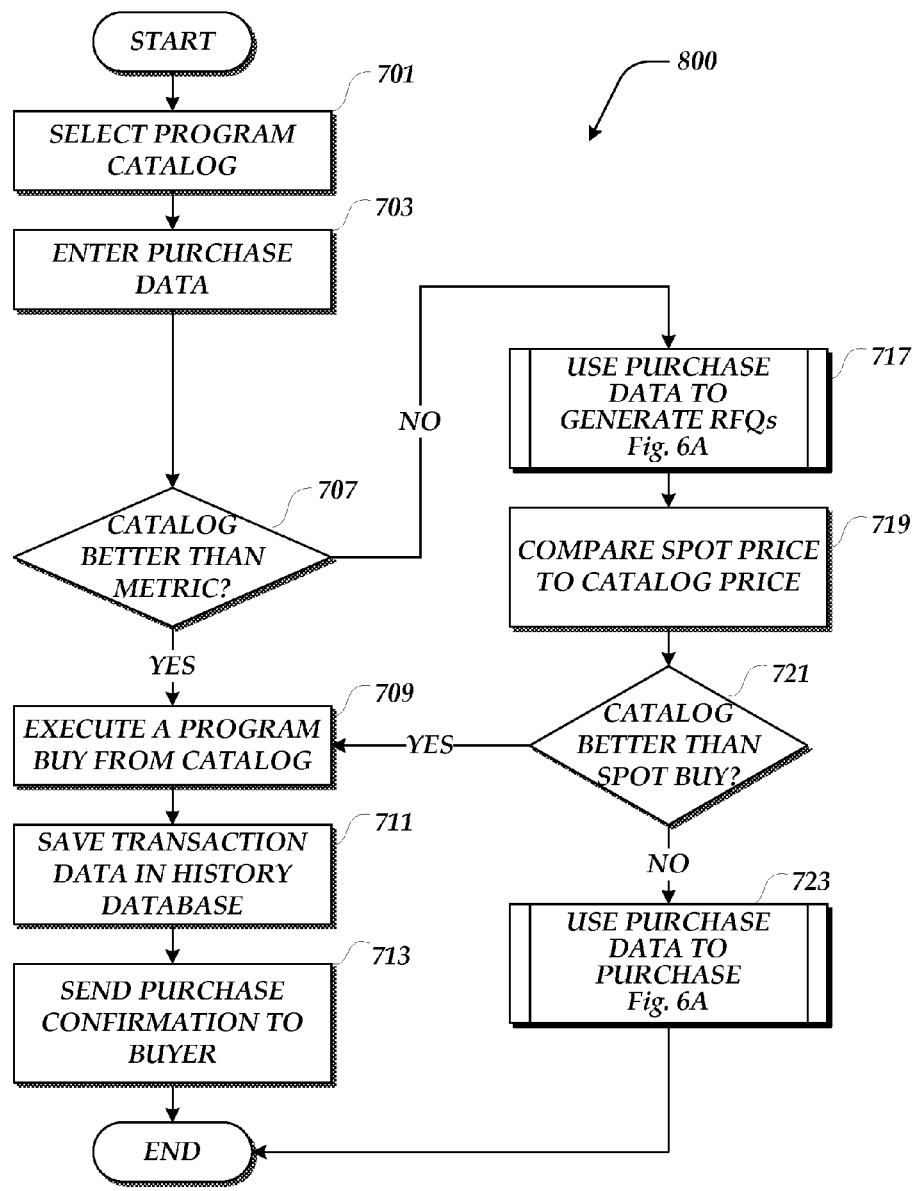
FIG. 7 is a flow diagram illustrating another embodiment of the logic used by the information server to execute the process of a catalog purchase.

Referring now to FIG. 7, a flow diagram illustrating yet another embodiment of the present invention is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at a step 701 where the buyer selects a program buy catalog 443. The program buy catalog 443 provides buyers with the published or pre-negotiated price of the desired products. Next, at a step 703, based on the catalog information, the buyer then enters their purchase data. Similar to the step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price, or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to a step 717 where the buyer's purchase data is entered into an RFQ. At this step, the process carries out the first five steps 601-609 of the method of FIG. 6A to provide buyers with the price data from the open market, as well as provide the normalized prices for each open market quote. At a step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. The steps 709-713 used to carry out the catalog purchase are the same as if the buyer had selected the catalog purchase in step 707. However, if at decision block 721 the buyer selects the option to proceed with the market purchase, the process continues to a step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons, and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for various third parties as well as provide a means of calculating current market prices for products sold in the above-described methods. The sales history records are also used as the source for a metric such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation, for purposes of determining purchasing strategies, buyer effectiveness, program performance, vendor performance, and measuring effectiveness of forward pricing as a risk management strategy.

Figure 9:
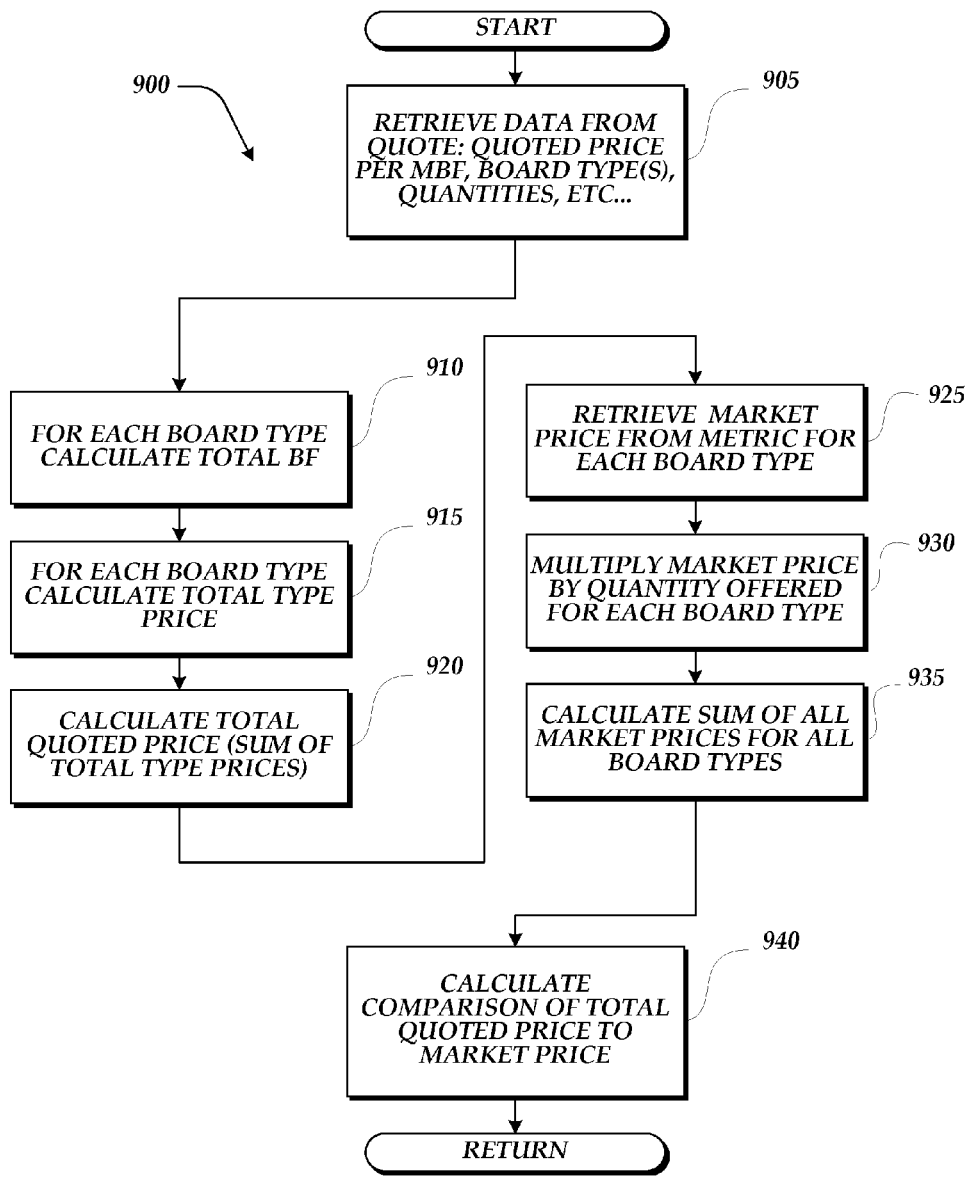
FIG. 9 is a flow diagram illustrating one embodiment of the normalization process in accordance with the present invention.

Referring now to FIG. 9, a flow diagram illustrating the logic of the normalization process 900 is shown. The logic of the normalization process 900 resides on the server 230 and processes the quotes received from commodity sellers. The logic begins in at a step 905 where quote data is obtained from the seller in response to the buyer's RFQ as described above.

Next, at a step 910, routine 900 iteratively calculates the board footage (BF) of each type of lumber. Once all the totals are calculated for each type, routine 900 continues to a step 915 where the server 230 calculates the total type price.

At step 915, routine 900 iteratively calculates the total type price for the amount of each type of lumber specified in the quote. The is accomplished by taking the total board footage (BF), calculated in block 910 and multiplying the total BF by the price per MBF specified in the quote. Once all the prices are calculated for each type, routine 900 continues to a step 920 where the server 230 calculates total quoted price. At step 920 the routine 900 calculates the total price for the quote by summing all of the total type prices calculated at step 915.

At a step 925, routine 900 iteratively retrieves the most current price for each type of lumber specified in the quote from a predefined metric source(s). Metrics may come from publicly available information, i.e., price of futures contracts traded on the Chicago Mercantile Exchange, subscription service publications such as Crowes™ or Random Lengths™, or internally generated metrics derived from the server database. Once all the prices are retrieved for each type, at a step 930 the routine 900 then iteratively calculates the market price for the quantity of each type of lumber in quote. Once the totals for all types are calculated, routine 900 continues to a step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one (1) percent indicates a price that is above the metric rate, and a lower percent indicates a price that is below the metric rate.

The operation of the routine 900 can be further illustrated through an example utilizing specific exemplary data. In the example, a buyer sends out a request for quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8's is $287.50, for 2"×4"× 14's it is $278.50, and for 2"×4"×16' it is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

To display the quotes, the server 230 produces a Web page similar to that displayed in FIG. 8C, where the vendor's modified tally is displayed in highlighted text. The buyer can then view summary metric comparison or select the hypertext link "View Calculation Detail," which then invokes the server 230 to produce a Web page as shown in FIG. 8D. Referring now to the Web page illustrated in FIG. 8D, the data produced by the server 230 compares the response to a selected metric of a different species, Western SPF (WSPF), for items of same size, grade, and tally. The market price for the same 2×4 tally of ESPF and WSPF are thus simultaneously compared. In an example, Eastern quoted at $322 per thousand board feet, Western metric (Random Lengths 6/26/2000 print price plus freight of $80 as defined in Metric Manager) for the same tally being $331.791. This metric comparison is also represented as Quote/Metric Value or Eastern price representing 0.970490 or 97% of comparable Western product.

In review of the normalization process, the buyer must select a metric source for price information for a defined item given a set of attributes, i.e., grade, species, and size. The metric may then be mapped to the RFQ item for comparison and does not have to be equivalent of the item. For instance, as explained in the above-described example, it may be desirable to map the market relationship of one commodity item to another. The most current pricing data for the metric is electronically moved from the selected source to the server 230. As mentioned above, metrics may come from publicly available information, (i.e., price of Futures contracts traded on the Chicago Mercantile Exchange), or subscription services, (i.e., Crowes™ or Random Lengths™ Publications), or be an internal metric generated by the server 230. This metric data is used in the normalization process for all calculations, as described with reference to the above-described methods.

While the preferred embodiment of the invention has been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items such as in the trade of livestock. In such a variation, order information such as a lumber tally would be substituted for a meat type, grade, and cut. Other examples of commodity items include agricultural products, metals, or any other items of commerce having several order parameters.

The embodiments of the invention in which an exclusive property or privilege is claimed are defined as follows:

1. A computer-implemented method for calculating comparison values for evaluating a transaction, the method comprising:
    receiving, by a computer, at least one request for quote, wherein the request for quote includes a product specification data set that identifies one or more items;
    receiving, by a computer, a plurality of price data sets, wherein each price data set identifies one or more items based on the product specification data set, each price data set including at least a parameter value and a price for the one or more items in the price data set, and wherein at least one price data set identifies an item having a different parameter value as compared to the item in another price data set;
    generating, by a computer, a comparison value for each price data set by:
        determining a price total from the price data set;
        for each of the one or more items in the price data set:
            obtaining metric data from at least one source, wherein the metric data includes a comparable price that is indicative of a market price for the item; and
            based on the comparable price for the item, determining a market price total for the item;
        calculating a summed market price total for the price data set by summing the market price totals for each of the one or more items in the price data set; and
        generating the comparison value by comparing the price total determined from the price data set to the summed market price total; and
    communicating, by a computer, the comparison value to at least one output.

2. The method of claim 1, wherein the comparison value represents a percent of market value for the items in the price data set.

3. The method of claim 1, further comprising:
    receiving a buy notice with respect to at least one price data set; and
    transmitting a purchase order to a provider of the at least one price data set.

4. The method of claim 1, further comprising:
    receiving a plurality of product specification data sets; and
    combining the plurality of product specification data sets to create a combined product specification data set,
    wherein the plurality of price data sets are based on the combined product specification data set.

5. The method of claim 1, wherein the parameter values pertain to at least one of a grade, a species, a quantity, a size, a type, a tally, a method of delivery, a delivery date, and a delivery location.

6. The method of claim 1, further comprising receiving an additional price data set as a result of a negotiation.

7. The method of claim 1, wherein said comparing the price total determined from the price data set to the summed market price total includes calculating a ratio by dividing the price total by the summed market price total.

8. The method of claim 1, wherein each price data set includes a quantity value for each of the items in the price data set, and wherein for each of the items in the price data set, the metric data comprises a comparable price per unit for the item and said determining a market price total for the item comprises multiplying the comparable price per unit by the quantity value for the item, thereby producing the market price total for the item.

9. A computer-implemented method for calculating comparison values for evaluating a transaction, the method comprising:
receiving, at a computer, a plurality of price data sets, wherein each price data set identifies one or more items and includes at least a parameter value and a quoted price for the one or more items in the price data set, and wherein at least one of the price data sets identifies an item having a different parameter value as compared to the item in another price data set;
generating, by a computer, one or more comparison values for each price data set by:
obtaining metric data from at least one source for one or more items in the price data set, wherein the metric data includes one or more metric prices for the one or more items; and
generating a comparison value by comparing the quoted prices for the one or more items in the price data set with the one or more metric prices for the one or more items; and
communicating, by a computer, the one or more comparison values to at least one output.

10. The method of claim 9, wherein the plurality of price data sets are responsive to a product specification data set that identifies one or more items.

11. The method of claim 10, wherein the product specification data set is a combined product specification data set that combines a plurality of product specification data sets from multiple buyer agents.

12. The method of claim 9, wherein the one or more metric prices represent comparable market prices for the one or more items in the price data set.

13. The method of claim 12, wherein the one or more comparison values indicate a percent of market value for the one or more items in the price data set.

14. The method of claim 9, further comprising:
receiving, from a buyer agent, a buy notice with respect to at least one price data set; and
transmitting a purchase order to a seller agent from whom the at least one price data set was received.

15. The method of claim 9, wherein the parameter values pertain to at least one of a grade, a species, a quantity, a size, a type, a tally, a method of delivery, a delivery date, and a delivery location.

16. A computer system for calculating comparison values for evaluating a transaction, the system comprising:
one or more computing devices in communication with one another, wherein:
at least one of the computing devices is configured to receive at least one request for quote, wherein the request for quote includes a product specification data set that identifies one or more items;
at least one of the computing devices is configured to receive a plurality of price data sets, wherein each price data set identifies one or more items based on the product specification data set, each price data set including at least a parameter value and a prices for the one or more items in the price data set, and wherein at least one price data set identifies an item having a different parameter value as compared to the item in another price data set;
at least one of the computing devices is configured to generate a comparison value for each price data set by:
determining a price total from the price data set;
for each of the items in the price data set:
obtaining metric data from at least one source, wherein the metric data includes a comparable price that is indicative of a market price for the item; and
based on the comparable price for the item, determining a market price total for the item;
calculating a summed market price total for the price data set by summing the market price totals for each of the items in the price data set; and
generating the comparison value by comparing the price total determined from the price data set to the summed market price total; and
at least one of the computing devices is configured to communicate the comparison value to at least one output.

17. The system of claim 16, wherein the comparison value represents a percent of market value for the items in the price data set.

18. The system of claim 16, wherein each price data set includes a quantity value for each of the items in the price data set, and wherein for each of the items in the price data set, the metric data comprises a comparable price per unit for the item and the one or more computing devices are configured to determine a market price total for the item by multiplying the comparable price per unit by the quantity value for the item.

19. The system of claim 16, wherein the one or more computing devices are configured to compare the price total determined from the price data set to the summed market price total by dividing the price total by the summed market price total to produce a ratio.

20. A non-transitory computer-readable medium having computer-executable instructions stored thereon, wherein the instructions, in response to execution, cause one or more computing devices to:
receive a plurality of price data sets, wherein each price data set identifies one or more items and includes at least a parameter value and a quoted price for the one or more items in the price data set, and wherein at least one of the price data sets identifies an item having a different parameter value as compared to the item in another price data set;
generate one or more comparison values for each price data set by:
obtaining metric data from at least one source for one or more items in the price data set, wherein the metric data includes one or more metric prices for the one or more items; and
generating a comparison value by comparing the quoted prices for the one or more items in the price data set with the one or more metric prices for the one or more items; and
communicate the one or more comparison values to at least one output.

21. The computer-readable medium of claim 20, wherein the instructions, in response to execution, cause the one or more computing devices to:
receive, from a buyer agent, a buy notice with respect to at least one price data set; and
transmit a purchase order to a seller agent from whom the at least one price data set was received.

22. The computer-readable medium of claim 20, wherein the parameter values pertain to at least one of a grade, a species, a quantity, a size, a type, a tally, a method of delivery, a delivery date, and a delivery location.

23. The computer-readable medium of claim 20, wherein the instructions, in response to execution, cause the one or more computing devices to receive an additional price data set as a result of a negotiation.

24. The computer-readable medium of claim 20, wherein the one or more metric prices represent comparable market prices for the one or more items in the price data set.

25. The computer-readable medium of claim 24, wherein the one or more comparison values indicate a percent of market value for the one or more items in the price data set.

26. A computer-implemented method for calculating comparison values for evaluating a transaction, the method comprising:
   receiving, at a computer, a product specification data set that identifies one or more items for a transaction;
   receiving, at a computer, at least one price data set corresponding to the product specification data set, wherein the at least one price data set identifies one or more items and each item includes at least a parameter value and a quoted price, and wherein the at least one price data set identifies an item having a different parameter value as compared to the item in the product specification data set;
   generating, by a computer, a comparison value for the at least one price data set by:
      obtaining metric data from at least one source for the one or more items in the price data set, wherein the metric data includes one or more metric prices for the one or more items; and
      generating the comparison value by comparing quoted prices from the price data set with the metric prices for the one or more items; and
   communicating, by a computer, the comparison value to at least one output.

27. The method of claim 26, wherein the comparison value represents a percent of market value for the one or more items in the price data set.

28. The method of claim 26, further comprising:
   receiving a plurality of product specification data sets; and
   combining the plurality of product specification data sets to create a combined product specification data set,
   wherein the at least one price data set corresponds to the combined product specification data set.

29. The method of claim 26, wherein for the item in the price data set having a different parameter value as compared to the item in the product specification data set, the method further comprises:
   obtaining metric data from at least one source for the item in the product specification data set, wherein the metric data includes a metric price for the item; and
   generating a further comparison value by comparing the quoted price for the item with the metric price for the item; and
   communicating, by a computer, the further comparison value to at least one output.

* * * * *